United States Patent [19]

Strobel et al.

[11] 4,450,583

[45] May 22, 1984

[54] MULTI-CHANNEL TRANSCEIVER USING A SINGLE HIGH-STABILITY ELEMENT

[75] Inventors: Russell A. Strobel, Sunrise, Fla.; Jawdat Rihani, Cairo, Egypt; Richard E. Lunquist, Pompano Beach, Fla.

[73] Assignee: Motorola, Inc., Schaumburg, Ill.

[21] Appl. No.: 324,205

[22] Filed: Nov. 23, 1981

[51] Int. Cl.³ .............................................. H04B 1/40
[52] U.S. Cl. .......................................... 455/86; 455/83
[58] Field of Search .................. 455/76, 77, 79, 83–87

[56] References Cited

U.S. PATENT DOCUMENTS

| 2,889,452 | 6/1959 | Bartley | 455/87 |
| 3,300,720 | 1/1967 | Kowols | 455/86 |
| 3,825,830 | 7/1974 | O'Connor | 455/86 |
| 4,231,116 | 10/1980 | Sekiguchi et al. | 455/87 |

OTHER PUBLICATIONS

"Servicing Synthesizers", Radio Electronics, pp. 61–65, Mar. 1978.

Primary Examiner—Jin F. Ng
Attorney, Agent, or Firm—Charles L. Warren; Donald B. Southard; James W. Gillman

[57] ABSTRACT

A multi-channel transceiver uses a single high-stability crystal to generate a signal that is multiplied to a frequency near a desired transmitting and receiving frequency. The multiplied frequency is mixed with the output of an offset oscillator having a frequency selected so that the sum or difference of the two frequencies is a desired transmission frequency and the other of the sum or difference is an appropriate frequency for a local oscillator. The offset oscillator may use crystals of lower frequency stability than that of the single high-stability crystal.

19 Claims, 1 Drawing Figure

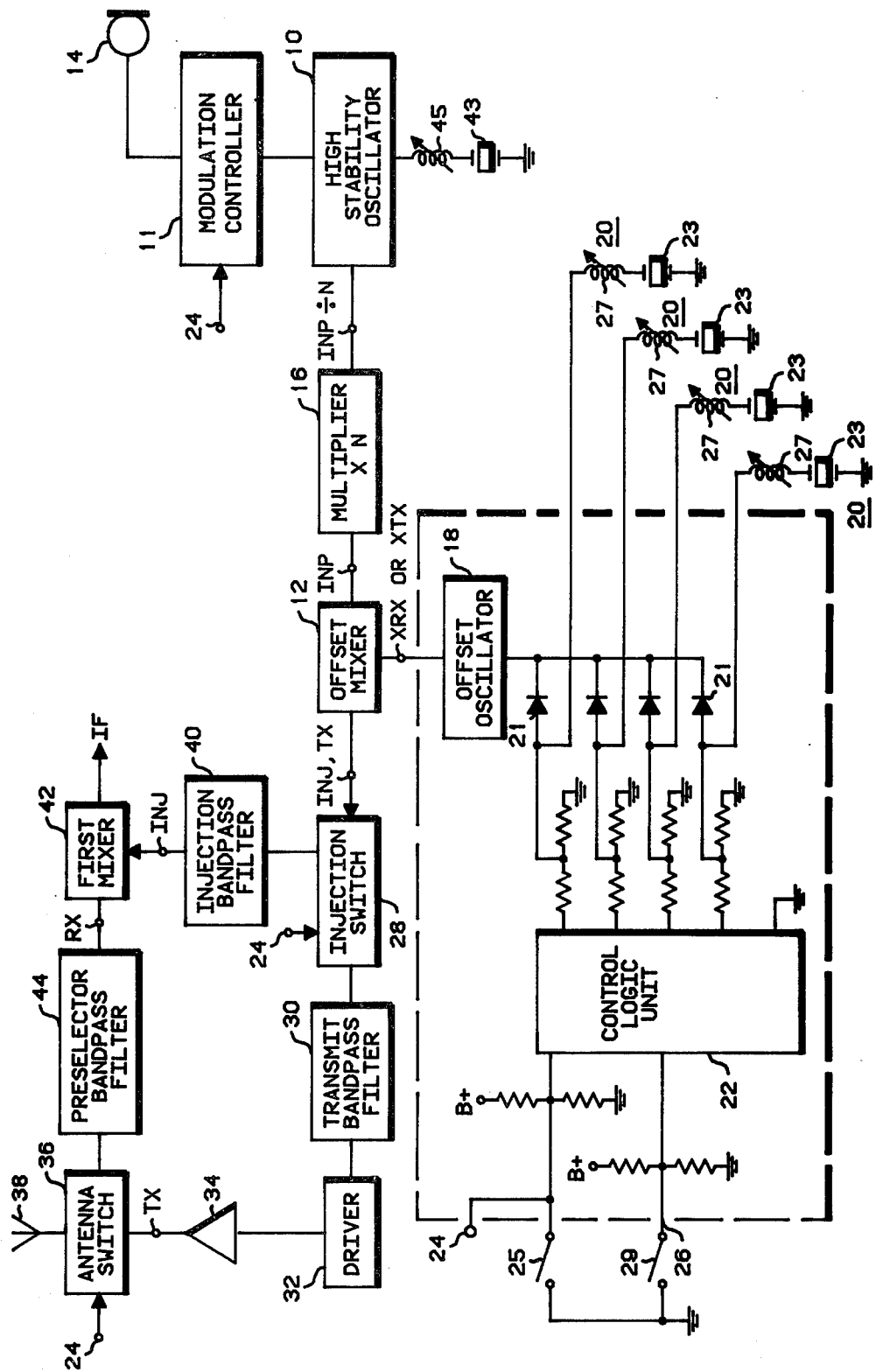

MULTI-CHANNEL TRANSCEIVER USING A SINGLE HIGH-STABILITY ELEMENT

BACKGROUND OF THE INVENTION

This invention relates to radio transceivers. In particular, it relates to a method and means of using a single high-stability frequency source to control transmission and to control a local oscillator upon receiving.

Most two-way radio communication is carried out using transceivers that transmit in one band of frequencies and receive in a different band of frequencies. An associated pair of frequency bands is often referred to as a channel. Thus, when a transceiver is operating in a particular channel, it must generate at least one frequency to transmit and at least one frequency with which to mix a received signal to produce a fixed intermediate frequency. The frequencies of transmission and reception may be the same but are usually different. As broadcast frequencies reach higher and higher bands, the need for stable oscillators increases the cost of transceivers, since the cost of oscillators increases rapidly as the allowable frequency deviation in parts per million is reduced. Since the stability of oscillators is a major factor in controlling interference between adjacent channels on transmitting and in maintaining selectivity on receiving, it has often been necessary in transceivers designed for VHF and higher frequencies, in the range of 150 MHz and above, to have two or more high-stability oscillators in a transceiver. This is a costly requirement. The use of a single high-stability oscillator would make it possible to produce a UHF transceiver at a lower cost.

SUMMARY OF THE INVENTION

It is an object of the present invention to achieve adequate frequency control for a transceiver with a single high-stability oscillator.

It is a further object of the present invention to use a single high-stability oscillator as the controlling source for both a transmitter and a local oscillator for a receiver at VHF frequencies and above.

Other objects will become apparent in the course of a detailed description of the invention.

A high-stability oscillator in a transceiver generates a modulated signal that is multiplied to a frequency near a desired transmitting and receiving frequency. The multiplied frequency is mixed with the output of an offset oscillator which has a frequency selected so that the sum or difference of the frequency of the offset oscillator and the high-stability oscillator is the desired transmission frequency, and the other of the sum or difference of these frequencies is an appropriate frequency for a local oscillator of a receiver in the same channel. The offset oscillator needs significantly lower frequency stability than the high-stability oscillator.

BRIEF DESCRIPTION OF THE DRAWING

The FIGURE is a functional block diagram of a circuit for the practice of the present invention.

DETAILED DESCRIPTION OF THE INVENTION

The FIGURE is a functional block diagram of a circuit for the practice of the present invention. While the FIGURE represents an FM transceiver, it should be understood that the invention works equally as well in broadcasting AM, single sideband, frequency-shift keying, or any other broadcast system. In the FIGURE, an oscillator 10 is the principal source of frequencies used by the transceiver of the FIGURE. Oscillator 10 is a high-stability oscillator operating at a fixed frequency. The output of oscillator 10 may be at a convenient frequency near the broadcast frequency or it may be lower than the desired range of frequencies to be broadcast and received. If oscillator 10 operates at a frequency that is close to the desired frequencies of transmitting and receiving, it could be connected directly to offset mixer 12. The FIGURE is drawn under the more likely assumption that it will be desirable to multiply the frequency of oscillator 10 to higher values. That is accomplished in the FIGURE by connecting the output of oscillator 10 to a multiplier 16, a circuit that produces an appropriate harmonic of the output of oscillator 10. During transmission, this harmonic will contain modulation which is applied by driving modulation controller 11 with audio from microphone 14. Modulation controller 11 may be an instantaneous deviation controller (IDC) or the like. A second input to offset mixer 12 is the output of offset oscillator 18. This is a low-stability crystal-controlled oscillator that has means for selecting a separate crystal assembly 20 for each transmit frequency and for each receive frequency. Each crystal assembly 20 includes a crystal 23. In the alternative, it may be a low-cost synthesizer with a reference oscillator of relatively low stability, or a surface-acoustic-wave (SAW) oscillator. PIN diodes 21 select particular crystal assemblies 20 under the control of logic unit 22 in response to signals on push-to-talk (PTT) line 24 to indicate transmission, and in response to a channel selector to provide a channel indication on line 26. The FIGURE indicates that two channels are available for use. These are designated "1" and "2", with a receiving crystal assembly 20 and a transmitting crystal assembly 20 for each frequency. This means that offset oscillator 18 has a frequency that is determined by one of four different crystals. It is clear that increasing the number of channels in the transceiver would be a matter of supplying more pairs of crystal assemblies and the appropriate switching logic to select them. In the alternative, a synthesizer might be so switched. Whichever is used, some means of fine tuning such as warp coils 27 will aid in the control of frequency.

Offset mixer 12 is a mixer that generates the sum and difference of the input frequencies. It may be a double-balanced mixer, which does this while cancelling the input frequencies themselves. The sum and difference frequencies are taken to injection switch 28 which is controlled by PTT line 24. When it is desired to transmit, a signal from PTT line 24 causes injection switch 28 to pass signals from offset mixer 12 to transmit filter 30. This is a band-pass filter that selects only one of the two bands of frequencies generated in offset mixer 12. Typically this will be the sum of the input frequencies, but this is a matter of design choice; it might be the difference. PTT line 24 also provides a signal to enable modulator 11 during transmission. The frequencies of the band that is selected by transmit filter 30 are taken to driver 32, where they are amplified and taken to power amplifier 34. The amplified frequencies from power amplifier 34 are coupled through antenna switch 36 to antenna 38. Antenna switch 36 is controlled by PTT line 24 to select the path from power amplifier 34 to antenna 38 when the signal on PTT line 24 indicates that the user desires to transmit signals.

Both antenna switch 36 and injection switch 28 are switched oppositely in a receiving mode. In this case, a signal from offset mixer 12 is switched by injection switch 28 to injection filter 40 which selects the one of the two output bands of frequencies from offset mixer 12 that was not selected by transmit filter 30. Typically, though not necessarily, this will be the lower of the two bands. The output of injection filter 40 serves as a local oscillator to be taken to first mixer 42. There it is mixed with a signal that is received on antenna 38 and switched by antenna switch 36 to preselector 44, then to first mixer 42. The output of first mixer 42 is an IF signal that is amplified and processed conventionally. The reference to first mixer 42 assumes that the receiver will have two or more intermediate frequencies and thus two or more stages of mixing to obtain these frequencies. If circuit considerations make it convenient to have a receiver with a single IF, then first mixer 42 is the only such mixer.

The crystals in crystal assembly 20 of the FIGURE will be seen in what follows to produce frequencies in the range of 10 to 28 MHz. These can be relatively inexpensive crystals, operated in the fundamental mode, with tolerances of the order of 25 parts per million. The same tolerance is adequate in a crystal for a frequency synthesizer to supply the offset frequencies. In contrast, oscillator 10 must be a precision oscillator with a stability of the order of 5 parts per million or better. This is typically obtained with a temperature-compensated third-overtone crystal 43, producing a signal somewhere in the frequency range of 42 to 70 MHz. A warp coil 45 serves to trim the output frequency of oscillator 10. A crystal such as crystal 43 typically costs of the order of ten times that of one of the fundamental-frequency crystals used in crystal assembly 20. It is, therefore, a distinct advantage to be able to use only one such expensive crystal and oscillator. For example, suppose a receiver at 450 MHz is required to have a stability of 5 parts per million (ppm). This allows a variation of 2250 Hz in either direction. The high-stability oscillator may provide a signal at 427 MHz within 4 ppm, a tolerance of 1708 Hz. This allows the offset oscillator to vary by (2250−1708) Hz or 542 Hz, which is 24.6 ppm at 22 MHz. Thus, 76% of the stability requirement has been provided by the high-stability oscillator, and only 24% is provided by the offset oscillator.

The various frequencies produced in the FIGURE are defined and related in Table 1. Each of the frequencies defined in Table 1 is identified at a test point in the FIGURE. The multiplication factor F is indicated as a function of multiplier 16 which may be a combination of a step-recovery diode with a filter to select a desired harmonic from among the many produced by the step-recovery diode. In the alternative, multiplier 16 may be a doubler, a tripler, or a combination of doublers and triplers. Switching network 22 may be implemented with a set of PIN diodes 21 connected to the offset crystals 20. The PIN diodes 21 are biased through a PTT line 24 and a frequency line 26 to connect the desired offset crystal 20 to offset oscillator 18. PTT line 24 is controlled by PTT switch 25 and frequency line 26 is controlled by frequency switch 29.

Table 1 also contains two sets of algebraic relations, labeled A and B. In both A and B the equation for the injection frequency INJ is indicated as having two possible algebraic signs. This is true because the injection may be above or below the desired receiving frequency. The negative sign produces low-side injection, the more usual choice. The other equations in group A are based on the assumption that the upper sideband produced by offset mixer 12 is taken as the transmitting frequency and the lower sideband is taken as the injection frequency. The reverse is true in equations B where the lower sideband from offset mixer is taken as the transmitting frequency and the higher sideband is taken as the injection frequency.

TABLE 1

Definitions and Relations of Frequencies and Factors in the Figure.

| | | |
|---|---|---|
| F | = | multiplication factor for frequency of high-stability crystal in oscillator 10 |
| TX | = | transmitting frequency of power amplifier 34 |
| RX | = | receiving frequency of preselector 44 |
| XTX | = | frequency of transmitting crystal in crystal assembly 20 |
| XRX | = | frequency of receiving crystal in crystal assembly 20 |
| INJ | = | injection frequency from injection filter 40 |
| IF | = | intermediate frequency or first intermediate frequency from first mixer 42 |
| INP | = | F × (frequency of high-stability crystal) from multiplier 16 |

| A. | | | B. | | |
|---|---|---|---|---|---|
| XTX | = | TX − INP | XTX | = | TX + INP |
| INJ | = | RX ± IF | INJ | = | RX ± IF |
| XRX | = | INP − INJ | XRX | = | INP + INJ |

Several sets of typical frequencies and multiplication factors for several frequency ranges are listed in Table 2. All of the values in Table 2 were obtained using equations A of Table 1 with a negative sign in the equation for INJ. Table 2 indicates frequencies for three ranges. The first, labeled A, is a set of VHF frequencies, of the order of 150 MHz. One example shows values for transmitting and receiving at the same frequency and a second shows transmitting and receiving frequencies offset by 1 MHz. Example B is in the UHF band, of the order of 450 MHz. In this band it may be desirable to transmit and receive at the same frequency or the offset between transmitting and receiving frequencies may be three or five MHz. All three of these are illustrated with typical values in equations B. Equations C illustrate typical values in the SHF band, upwards of 800 MHz. In this band transmitting and receiving frequencies may be the same or they may be offset by 45 MHz. Both possibilities are illustrated.

TABLE 2

Typical Frequencies and Multiplication Factors in the Figure. All frequencies are in MHz.

| A. VHF: IF = 22, INP = 139, F = 3 | | | | |
|---|---|---|---|---|
| Oscillator 10 = 46.333 | | | | |
| TX | RX | XTX | INJ | XRX |
| 150 | 150 | 11 | 128 | 11 |
| 152 | 151 | 13 | 129 | 10 |
| B. UHF: IF = 45, INP = 427, F = 8 | | | | |
| Oscillator 10 = 53.375 | | | | |
| TX | RX | XTX | INJ | XRX |
| 450 | 450 | 23 | 405 | 22 |
| 451 | 449 | 24 | 404 | 23 |
| 455 | 450 | 28 | 405 | 22 |
| C. SHF: IF = 50, INP = 835, F = 16 | | | | |
| Oscillator 10 = 52.1875 | | | | |
| TX | RX | XTX | INJ | XRX |
| 860 | 860 | 25 | 810 | 25 |
| 815 | 860 | 20 | 810 | 25 |
| 820 | 865 | 15 | 815 | 20 |

It can be seen by an inspection of the FIGURE that injection filter 40 must pass the frequencies INJ and stop the frequencies TX while the reverse is true of filter 30. Algebraic manipulations of the definitions of Table 1 shows that for equations A the difference between frequencies TX and INJ is equal to the sum of the frequencies XTX and XRX, while for equations B it is equal to the difference, (XTX−XRX). The relative differences in frequencies determine the lower limit of utility of the present invention. As the frequencies TX and INJ are brought closer together, the advantage of using a single high-stability crystal in oscillator 10 is lost in the necessity for increasing the selectivity of filter 30 and injection filter 40 to select the desired frequencies. The lower limit of useful frequencies is of the order of 100 MHz. In contrast, either the equations A or B of Table 1 can readily be used in the frequency range above 800 MHz, giving the circuit designer an added measure of flexibility.

We claim:

1. A method of producing a transmission signal and a local-oscillator signal in a transceiver comprising the steps of:
   (a) producing an input signal at a frequency that is maintained with relatively high stability;
   (b) producing an offset signal at a frequency that is maintained with relatively low stability;
   (c) mixing the input signal and the offset signal to produce a sum and difference signal, one of said sum and difference signal representing an injection signal and the other of said sum and difference signal representing the transmission signal;
   (d) selecting the transmission signal to transmit from a transmitter portion of the transceiver; and
   (e) selecting the injection signal to serve as the local-oscillator signal for a receiver portion of the transceiver.

2. The method of claim 1 wherein the step of producing an input signal comprises producing a modulated input signal.

3. The method of claim 1 wherein the step of mixing comprises the step of applying the input signal and the offset signal to a mixer to produce an injection signal, the transmission signal and components of the input signal and the offset signal.

4. The method of claim 1 wherein the step of mixing comprises the step of applying the input signal and the offset signal to a balanced mixer to produce an injection signal and the transmission signal and to suppress components of the input signal and the offset signal.

5. The method of claim 1 wherein the step of selecting the transmission signal comprises the steps of:
   (a) operating a switch in a desired path; and
   (b) filtering a signal in the desired path to select only desired components to control a transmitter to transmit.

6. The method of claim 1 wherein the step of selecting the injection signal comprises the steps of:
   (a) operating a switch in a desired path; and
   (b) filtering a signal in the desired path to select only the injection signal to serve as the local-oscillator signal in the receiver portion.

7. An apparatus for producing a transmission signal and a local-oscillator signal in a transceiver comprising:
   (a) means for producing an input signal at a frequency that is maintained with relatively high stability;
   (b) means for producing an offset signal at a frequency that is maintained with relatively low stability;
   (c) means for mixing the input signal and the offset signal to produce a sum and difference signal, one of said sum and difference signal representing an injection signal and the other of said sum and difference signal representing the transmission signal; and
   (d) means for selecting the transmission signal to control a transmitter portion of said transceiver to transmit and the injection signal to serve as the local-oscillator signal for a receiver portion of the transceiver.

8. The apparatus of claim 7 wherein the means for producing an input signal comprises means for producing a modulated input signal.

9. The apparatus of claim 7 wherein the means for mixing comprises a balanced mixer connected to the means for producing an input signal and to the means for producing an offset signal, the balanced mixer producing an injection signal and the transmission signal and suppressing components of the input signal and the offset signal.

10. The apparatus of claim 9 wherein the means for selecting the transmission signal comprises:
    (a) a switch connected to the balanced mixer to select a first desired path; and
    (b) a first filter in the first desired path connected to the balanced mixer to select only desired components to control a transmitter to transmit.

11. The apparatus of claim 10 wherein the means for selecting the injection signal comprises a second filter connected to the switch in a second desired path to select only the injection signal to serve as the local-oscillator signal in the receiver portion.

12. A circuit for determining a transmission frequency and a local-oscillator injection frequency in a transceiver the circuit comprising:
    (a) a high-stability frequency determiner;
    (b) a low-stability offset frequency determiner;
    (c) a mixer connected to the frequency determiner and the offset determiner to receive and mix outputs of the high-stability frequency determiner and the offset frequency determiner to produce a sum and difference frequency signal;
    (d) a first selector connected to the mixer to receive the outputs from the high-stability mixer and select therefrom one of said sum and difference frequency signal for transmission by the transceiver; and
    (e) a second selector connected to the mixer to receive the outputs from the mixer and select therefrom an injection frequency signal corresponding to the other of said sum and difference frequency signal to serve as a local-oscillator frequency for a receiver of the transceiver.

13. The circuit of claim 12 wherein the high-stability frequency determiner comprises:
    (a) an oscillator controlled by a single high-stability crystal; and
    (b) a multiplier connected to the oscillator to produce a signal at a frequency that is an integral multiple of the frequency of the signal from the oscillator.

14. The circuit of claim 13 comprising in addition:
    (a) a microphone responsive to sound to produce audio-frequency electrical signals; and
    (b) a modulator connected to the microphone and the high-stability oscillator and responsive to the audio-frequency electrical signals to modulate the output of the high-stability oscillator.

15. The circuit of claim 14 wherein the modulator is an instantaneous deviation controller.

16. The circuit of claim 12 wherein the offset frequency determiner comprises a crystal-controlled oscillator controlled by a crystal of relatively low precision in frequency.

17. The apparatus of claim 12 wherein the offset frequency determiner comprises:
   (a) an offset oscillator;
   (b) a transmission crystal;
   (c) a receiving crystal;
   (d) a push-to-talk (PTT) switch; and
   (e) a switching network connected to the transmission crystal, the receiving crystal, the offset oscillator, and the PTT switch to connect the transmission crystal to the offset oscillator in response to a signal from the PTT switch and to connect the receiving crystal to the offset oscillator in the absence of an indication from the PTT switch.

18. The circuit of claim 17 wherein the first selector comprises:
   (a) an injection switch connected to the offset mixer and the PTT switch and producing an output on a first line in response to a signal from the PTT switch; and
   (b) a first bandpass filter connected to the line to receive and pass only a desired transmit signal.

19. The circuit of claim 18 wherein the second selector comprises a second bandpass filter connected to the injection switch to receive and select a desired injection frequency when the PTT switch is not energized.

* * * * *

UNITED STATES PATENT AND TRADEMARK OFFICE
CERTIFICATE OF CORRECTION

PATENT NO. : 4,450,583
DATED : May 22, 1984
INVENTOR(S) : Jawdat Y. Rihani et al It is certified that error appears in the above-identified patent and that said Letters Patent are hereby corrected as shown below:

In column 6, line 36, claim 12, after "the" insert --high-stability--.

In column 6, line 42, claim 12, after "the" delete --high-stability--.

Signed and Sealed this

Twenty-fifth Day of December 1984

[SEAL]

Attest:

Attesting Officer

GERALD J. MOSSINGHOFF

Commissioner of Patents and Trademarks